US 8,549,083 B2

(12) United States Patent  (10) Patent No.: US 8,549,083 B2
Cai et al.  (45) Date of Patent: Oct. 1, 2013

(54) MESSAGE WAITING NOTIFICATION TO EXTERNAL MESSAGE CENTERS

(75) Inventors: Yigang Cai, Naperville, IL (US); Robert Calabrese, Naperville, IL (US); Atul Halari, Bartlett, IL (US); Harold Smith, Oakbrook Terrace, IL (US)

(73) Assignee: Alcatel Lucent, Paris (FR)

( * ) Notice: Subject to any disclaimer, the term of this patent is extended or adjusted under 35 U.S.C. 154(b) by 443 days.

(21) Appl. No.: 12/652,815

(22) Filed: Jan. 6, 2010

(65) Prior Publication Data
US 2011/0167118 A1  Jul. 7, 2011

(51) Int. Cl.
*G06F 15/16* (2006.01)

(52) U.S. Cl.
USPC ............ 709/206; 709/224; 709/246; 370/241

(58) Field of Classification Search
USPC .................................. 709/206, 223; 370/401
See application file for complete search history.

(56) References Cited

U.S. PATENT DOCUMENTS

| | | | | |
|---|---|---|---|---|
| 5,369,686 A * | 11/1994 | Dutra et al. | ................. | 379/93.24 |
| 5,917,430 A * | 6/1999 | Greneker et al. | ............. | 340/905 |
| 6,311,056 B1 * | 10/2001 | Sandidge | .................... | 455/414.1 |
| 6,351,522 B1 * | 2/2002 | Vitikainen | ................... | 379/67.1 |
| 6,731,926 B1 * | 5/2004 | Link et al. | .................. | 455/412.2 |
| 7,031,443 B2 * | 4/2006 | St-Onge et al. | ............ | 379/88.17 |
| 7,254,220 B1 * | 8/2007 | Reding et al. | .............. | 379/88.17 |
| 7,483,977 B2 * | 1/2009 | Mikhailov et al. | ............ | 709/224 |
| 7,617,328 B2 * | 11/2009 | Lewis et al. | .................... | 709/246 |
| 8,078,761 B2 * | 12/2011 | Cardina et al. | ................ | 709/246 |
| 2002/0136173 A1 * | 9/2002 | Monroe et al. | ................. | 370/328 |
| 2003/0083078 A1 * | 5/2003 | Allison et al. | ................. | 455/466 |
| 2003/0095644 A1 * | 5/2003 | St-Onge et al. | ............ | 379/88.17 |
| 2005/0010644 A1 * | 1/2005 | Brown et al. | ................. | 709/206 |

(Continued)

FOREIGN PATENT DOCUMENTS
DE  19740558 A1  3/1999

OTHER PUBLICATIONS

VODAFONE: "Addition of Capability to Route MT-SMs via the HPLMN of the Receiving MS", 3GPP Draft; C1-070636, 3rd Generation Partnership Project (3GPP), Mobile Competence Centre; 650, Route Des Lucioles, F-06921 Sophia-Antipolis Cedex; France, vol. CT WG1, No. Vancouver, Canada; 20070212, Feb. 12, 2007, XP050024853.

(Continued)

*Primary Examiner* — Wing F Chan
*Assistant Examiner* — Tesfay Yohannes
(74) *Attorney, Agent, or Firm* — Duft Bornsen & Fettig LLP

(57) ABSTRACT

Systems and methods are disclosed for notifying external message centers when a mobile device becomes available to receive a text message. One embodiment includes a message waiting system that identifies a failed delivery attempt of a text message to a mobile device that is unavailable, where the text message originated from an external message center. The system identifies routing information for the external message center based on the failed delivery attempt, generates a Message Waiting Indicator (MWI) record for the text message that includes the routing information for the external message center, and stores the MWI record. When the system identifies that the mobile device becomes available, the system identifies the MWI record that includes information on the failed delivery attempt to the mobile device, and sends a notification indicating that the mobile device is available to the external message center based on the routing information in the MWI record.

20 Claims, 7 Drawing Sheets

(56) References Cited

U.S. PATENT DOCUMENTS

| | | | |
|---|---|---|---|
| 2005/0176410 A1* | 8/2005 | Brooking et al. | 455/412.1 |
| 2006/0177016 A1* | 8/2006 | Gallick et al. | 379/67.1 |
| 2006/0206488 A1* | 9/2006 | Distasio | 707/10 |
| 2007/0191035 A1* | 8/2007 | Huggett | 455/466 |
| 2007/0286157 A1 | 12/2007 | Shaikh | |
| 2008/0188249 A1* | 8/2008 | Wilson | 455/466 |
| 2009/0233630 A1* | 9/2009 | Wilson | 455/466 |
| 2011/0117939 A1* | 5/2011 | Shaw | 455/466 |
| 2011/0142210 A1* | 6/2011 | Detering et al. | 379/88.13 |
| 2011/0216656 A1* | 9/2011 | Pratt et al. | 370/241 |
| 2012/0214459 A1* | 8/2012 | Zabawskyj et al. | 455/417 |

OTHER PUBLICATIONS

"Digital cellular telecommunications system (Phase 2+); Interface protocols for the connection of SHort Message Service Centres (SMSCs) to Short Message Service Centres (SMSCs) to Short Message Entities (SMEs) (GSM 03.39 version 7.0.0 Release 1998)", 3GPP Standard; ETSI TR 101 632, 3rd Generation Partnership Project (3GPP), Mobile Competence Centre; 650, Route Des Lucioles; F-06921 Sophia-Antipolis Cedex; France, No. V7.0.0, Jun. 1, 2000, pp. 1-123, XP050357896.

* cited by examiner

MESSAGE WAITING NOTIFICATION TO EXTERNAL MESSAGE CENTERS

BACKGROUND

1. Field of the Invention

The invention is related to the field of communications and, in particular, to delivery of text messages.

2. Statement of the Problem

Text messaging has become a very popular mode of communication in many mobile networks, such as a Public Land Mobile Network (PLMN). One example of text messaging is Short Message Service (SMS), which is a communication protocol allowing the exchange of short text messages (i.e., 160 characters) between mobile devices. While the term "text message" traditionally referred to text-only messages sent using SMS, it has been extended to include multimedia messages, such as images, video, sound content, etc. The multimedia messages may be sent using Multimedia Service (MMS) protocol. Often times, mobile users more frequently use text messaging for communication than voice calls.

Text messages are transmitted over signaling channels of a mobile network, such as over SS7 channels. An SMS Center (SMSC) in the mobile network has a store-and-forward (SFD) system for delivering text messages to their destinations over the signaling channels. Upon initially receiving a text message, the SFD system first stores (persistently) the text message, and then initiates a delivery attempt for the text message. If the first delivery attempt fails, then the SFD system enters a retry process which will retry delivery a predefined number of times before the text message is discarded.

A mobile device has an associated home mobile network, which comprises the network or portion of the network in which a subscriber profile is stored and maintained for the mobile device. Text messaging is provided to the mobile device through a home message center, such as a home SMSC or a home MMSC. The home message center is implemented in the home mobile network, and handles Mobile Originated (MO) text messages from the mobile device and Mobile Terminated (MT) text messages destined for the mobile device. The following illustrates an example of delivering a MT text message to a mobile device.

To start, the home message center receives the text message from its originator. A SFD system in the home message center receives and stores the text message. The SFD system then queries a Home Location Register (HLR) in the home mobile network to identify routing information for the text message. The SFD system then attempts to deliver the text message to the mobile device based on the routing information by sending the text message to a Mobile Switching Center (MSC) in the home and/or roaming mobile network that is serving the mobile device. The serving MSC attempts to forward the text message to the mobile device. If the first delivery attempt fails (e.g., the mobile device is temporarily unavailable), then the serving MSC sends a return result to the home message center indicating the failed delivery. The SFD system then queues the text message for a future retry.

When the delivery attempt fails, the serving MSC (or the HLR) sets a message waiting indicator flag that indicates to the serving MSC that a text message is waiting in the home message center. When the mobile device becomes available, the serving MSC detects this event and its internal logic processes the message waiting indicator flag to see if it is set. If the flag is set (as in this example), then the serving MSC sends a notification (e.g., an SMS notification) to the home message center that the mobile device is now available. After receiving the notification from the serving MSC, the SFD system in the home message center retries delivery of the text message to the mobile device.

Technology in mobile networks has advanced such that text messages may be delivered to a mobile device from multiple message centers other than the home message center. These "other" message centers, which are referred to herein as "external" or "non-home" message centers, may attempt to deliver text messages to the mobile device directly without going through the home message center. Some examples of external message centers include a commercial broadcast message center, an emergency broadcast message center, a voting message center, content applications, payment servers, location servers, etc. Some of these external message centers may be referred to generally as External Short Messaging Entities (ESME).

Problems may occur when an external message center attempts to deliver a text message to a mobile device, but the delivery attempt fails because the mobile device is temporarily unavailable. Presently, when the delivery attempt fails, the serving MSC (or the HLR) sets a single message waiting indicator flag. The flag is set so that the serving MSC is able to notify the home message center when the mobile device becomes available. If the serving MSC determines that the mobile device becomes available, the serving MSC sends a notification to the home message center so that the home message center may initiate a retry. The serving MSC is programmed with a static routing address for the home message center, and sends the notification automatically to the static routing address when the message waiting indicator flag is set and the mobile device becomes available. Thus, the home message center is the only entity that is notified of the mobile device becoming available. The serving MSC is not able to notify external message centers of the mobile device becoming available.

SUMMARY

Embodiments described herein allow external message centers to be notified when a mobile device becomes available so that the external message centers may retry delivery of text messages. When there is a failed delivery attempt of a text message from an external message center, a message waiting indicator (MWI) record is stored for the text message that includes routing information for the external message center. If the mobile device becomes available, a notification is sent to the external message center based on the routing information stored in the MWI record. Thus, external message centers may be notified directly when a mobile device becomes available. This allows the external message centers to more effectively implement retry processes.

One embodiment comprises a message waiting system implemented in a mobile network. The message waiting system includes a storage system operable to store message waiting indicator (MWI) records. The message waiting system further includes a control system that is operable to identify a failed delivery attempt of a text message to a mobile device that is unavailable, where the text message originated from an external message center. The control system is further operable to identify routing information for the external message center based on the failed delivery attempt, and to generate a MWI record for the text message that includes the routing information for the external message center. The control system is further operable to store the MWI record in the storage system. The control system is further operable to identify when the mobile device becomes available. When this occurs, the control system is further operable to identify the MWI record in the storage system that includes information on a failed delivery attempt to the mobile device, and to send a notification indicating that the mobile device is available to the external message center based on the routing information in the MWI record.

In another embodiment, the control system is further operable to identify a signaling protocol used by the external message center, and to store an indication of the signaling protocol in the MWI record. When the control system sends the notification to the external message center, the control system is further operable to send the notification to the external message center based on the signaling protocol indicated in the MWI record.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
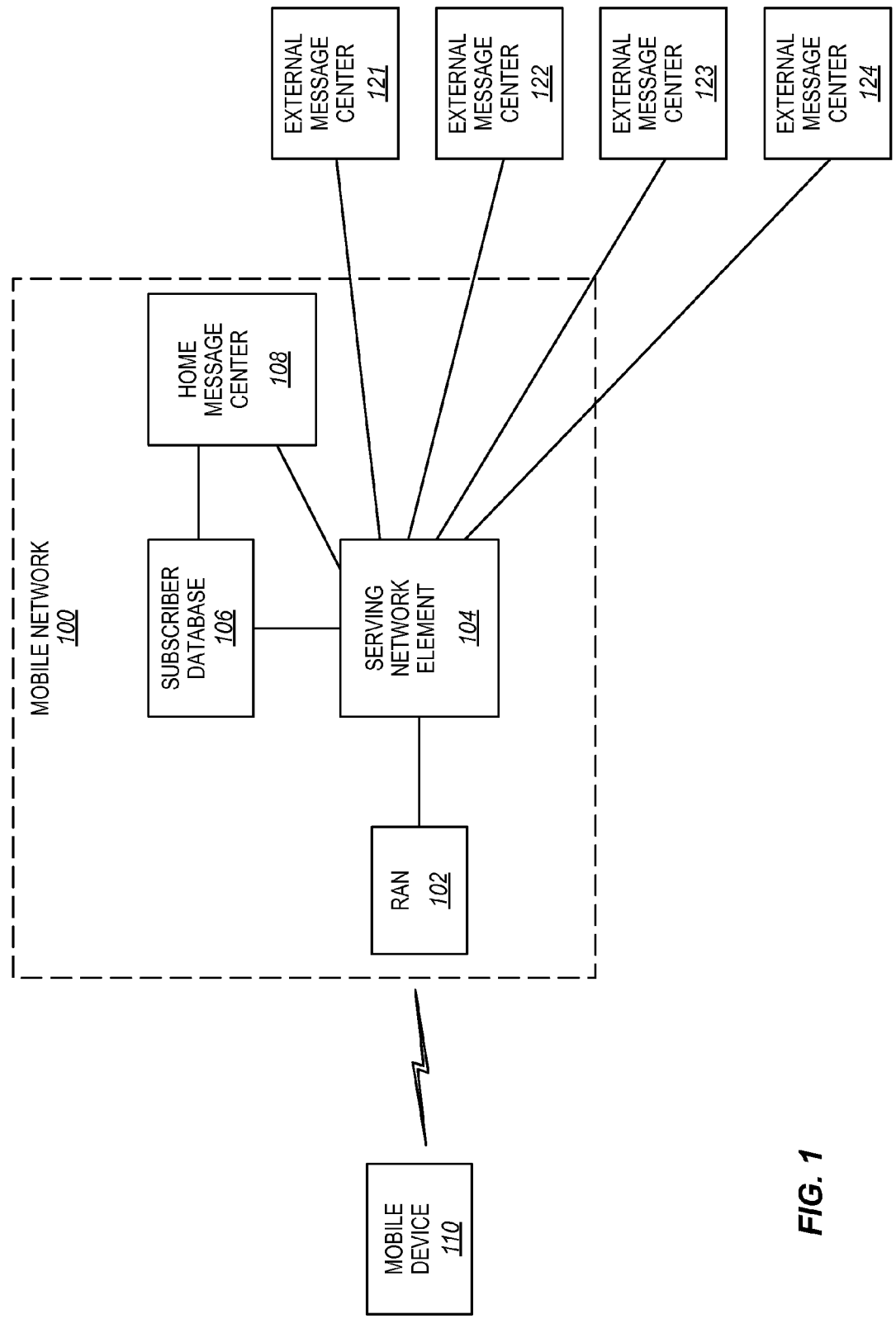
FIG. 1 illustrates a mobile network in an exemplary embodiment.

FIG. 1 illustrates a mobile network 100 in an exemplary embodiment. Mobile network 100 may comprise a circuit-based network, such as a CDMA network or a GSM network, may comprise a packet-based network, such as an IP Multimedia Subsystem (IMS) network, or a mix of the two. Mobile network 100 serves as a home mobile network for a mobile device 110 and is able to facilitate the transfer of a text message to a mobile device 110 (a Mobile Terminated (MT) text message).

In this embodiment, mobile network 100 includes a Radio Access Network (RAN) 102, a serving network element 104, and a subscriber database 106. RAN 102 comprises any radio or wireless network that interfaces a mobile device with a core network (represented by serving network element 104 in FIG. 1). Examples of RAN 102 include a GSM RAN, a CDMA RAN, and a UMTS RAN. Serving network element 104 comprises any switch, server, or other node in a core network that serves mobile devices. For instance, serving network element 104 may comprise an MSC in a circuit-based network, or may comprise a Call Session Control Function (CSCF) in a packet-based IMS network. Subscriber database 106 comprises any database or similar system that stores and maintains subscriber information or a subscriber profile for one or more mobile subscribers. For instance, subscriber database 106 may maintain a subscriber profile for a user of mobile device 110.

Mobile network 100 also includes a home message center 108. Home message center 108 comprises any system, server, or node operable to handle text messages within home mobile network 100. Thus, when an MT text message is destined for mobile device 110, the MT text message is typically delivered by home message center 108. Home message center 108 may comprise an SMSC, an MMSC, or another type of message center.

Although MT text messages are typically handled by home message center 108, mobile network 100 allows some MT text messages to be sent directly to mobile device 110 through one or more external message centers. Thus, a plurality of external message centers 121-124 are further shown in FIG. 1 as connected to mobile network 100. Some examples of external message centers 121-124 include a commercial broadcast message center, an emergency broadcast message center, a voting message center, content applications, payment servers, location servers, etc. Although not shown in FIG. 1, external message centers 121-124 may be connected to subscriber database 106, as external message centers 121-124 may or may not query subscriber database 106 for routing information.

In FIG. 1, assume that external message center 121 sends a text message to mobile network 100 that is intended for mobile device 110. Those skilled in the art will appreciate that the text message is encapsulated in a signaling message, such as an SS7 message or a SIP message. Instead of forwarding the text message to home message center 108 for delivery, external message center 121 sends the text message to serving network element 104, and serving network element 104 attempts to deliver the text message to mobile device 110 over RAN 102. Further assume that mobile device 110 is not available to receive the text message at this time. When mobile device 110 is "not available", this means that mobile device 110 is indicated as registered with mobile network 100, but is not able to receive or process a text message for a (e.g., brief) time period. For example, mobile device 110 may be temporarily out of the service area of RAN 102, may have temporarily powered off, etc. Because mobile device 110 is not available, the delivery attempt of the text message fails. Thus, serving network element 104 sends a return result message to external message center 121 indicating that the delivery failed.

If mobile device 110 becomes available after the delivery attempt failed, mobile network 100 is able to notify external message center 121 when the mobile device 110 becomes available. This is accomplished through a message waiting system implemented within mobile network 100, which is shown in FIG. 2.

Figure 2:
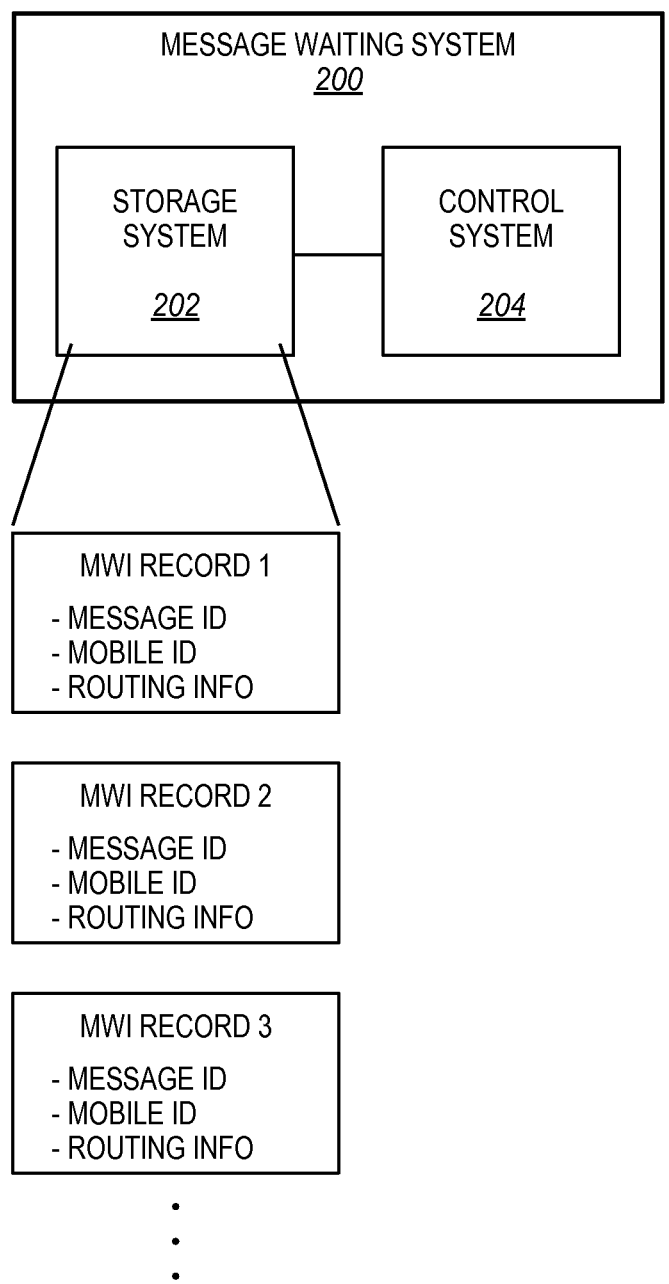
FIG. 2 illustrates a message waiting system in an exemplary embodiment.

FIG. 2 illustrates a message waiting system 200 in an exemplary embodiment. Message waiting system 200 is able to notify external message centers that a mobile device has become available after the external message centers had delivery attempts to the mobile device fail. Message waiting system 200 includes a storage system 202 and a control system 204. Storage system 202 comprises any memory, cache, or other storage mechanism that is operable to store data (also referred to as a message waiting indicator (MWI) record) which indicates that a text message is waiting in an external message center. The MWI record may include any information or data related to a failed delivery attempt of a text message. For example, the MWI record may include a message ID for a text message, a mobile ID for a mobile device, and routing information for an external message center. The MWI record may include other information, such as a MWI flag, a signaling protocol used by an external message center, etc.

Control system 204 comprises any device, component, or element operable to notify an external message center when a mobile device becomes available. Message waiting system 200 may be implemented in serving network element 104, in subscriber database 106, or in another node of mobile network 100 (see FIG. 1). A more detailed operation of message waiting system 200 is illustrated in FIG. 3.

Figure 3:
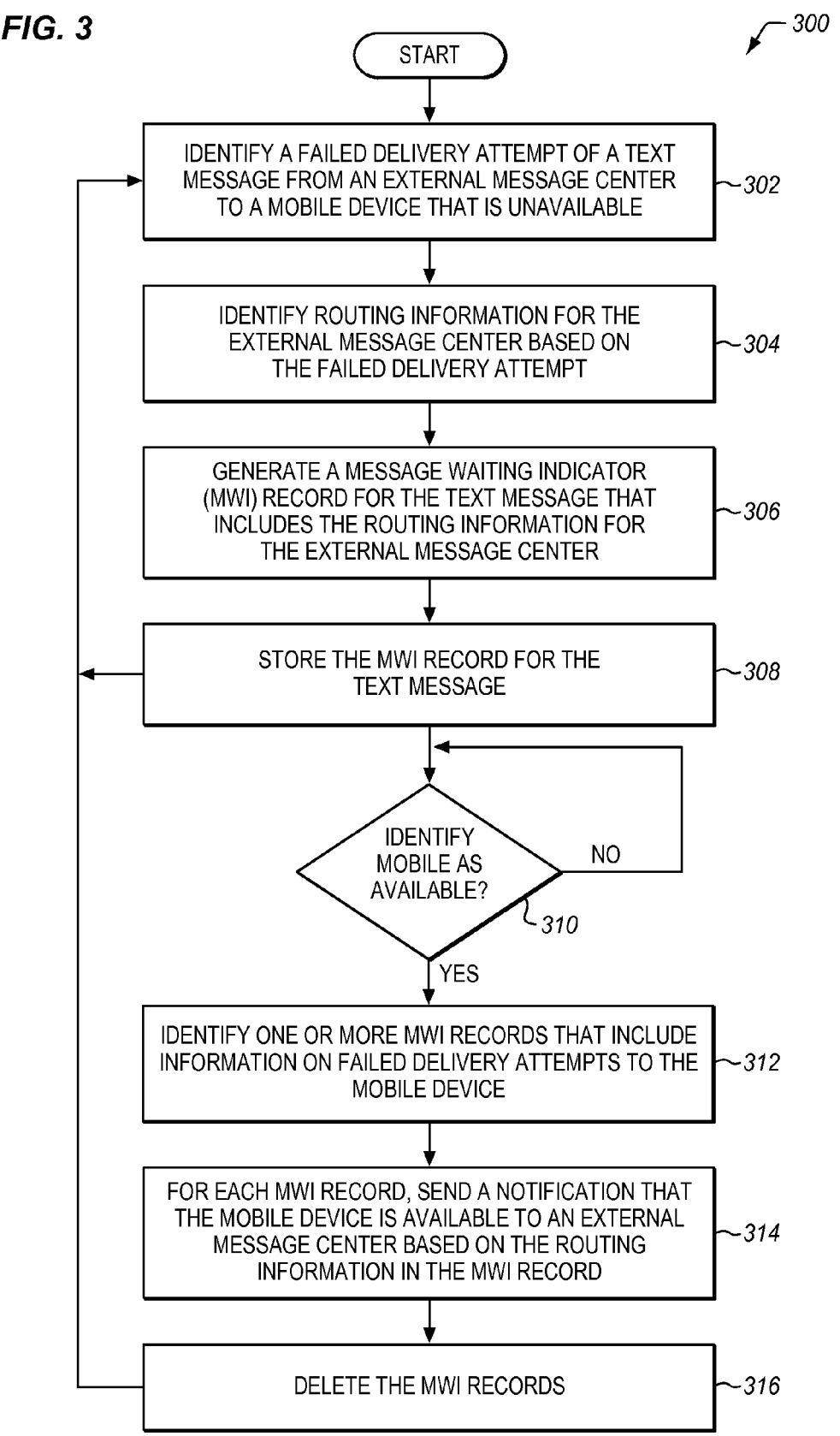
FIG. 3 is a flow chart illustrating a method of notifying external message centers when a mobile device becomes available in an exemplary embodiment.

FIG. 3 is a flow chart illustrating a method 300 of notifying external message centers when a mobile device becomes available in an exemplary embodiment. The steps of method 300 will be described with reference to mobile network 100 in FIG. 1 and message waiting system 200 in FIG. 2, but those skilled in the art will appreciate that method 300 may be performed in other networks and systems. The steps of the flow charts described herein are not all inclusive and may include other steps not shown. The steps may also be performed in an alternative order.

In step 302, control system 204 identifies the failed delivery attempt of the text message from external message center 121 to mobile device 110. In step 304, control system 204 identifies routing information for external message center 121 based on the failed delivery attempt. In other words, control system 204 may identify the routing information based on data sent along with the text message. For instance, when external message center 121 sends the text message to serving network element 104 for delivery to mobile device 110, the signaling message that encapsulates the text message may include an originating address for external message center 121. For example, the originating address may comprise a point code for external message center 121, an Internet Protocol (IP) address for external message center 121, or some other type of address or routing information. Thus, when the delivery attempt fails, control system 204 may process the signaling message for the delivery attempt to identify the originating address for external message center 121.

In step 306, control system 204 generates a MWI record for the text message that includes the routing information for external message center 121. The MWI record comprises any information, file, or collection of data (structured or unstructured) for a text message where delivery of the text message has failed and the text message is being queued in an external message center for delivery. The routing information for external message center 121 is stored in the MWI record. For example, control system 204 may include a point code or IP address for external message center 121 in the MWI record. Control system 204 may also include a mobile identifier (ID) for mobile device 110 in the MWI record, and a message ID for the text message. In step 308, control system 204 stores the MWI record for the text message in storage system 202.

During the time that mobile device 110 is unavailable, external message center 121 or other external message centers 122-124 may attempt delivery of text messages to mobile device 110. For each instance where a delivery attempt fails, control system 204 generates a MWI record for the text message and stores the MWI record in storage system 202 (see steps 306 and 308). Thus, storage system 202 may store multiple MWI records for failed delivery attempts of text messages to mobile device 110.

At some point, mobile device 110 may become available and is thus able to receive text messages. Control system 204 is able to identify when mobile device 110 becomes available in step 310. For example, control system 204 may identify that mobile device 110 has attempted to initiate a voice call or send a text message. Control system 204 may identify that mobile device 110 registers or re-registers with subscriber database 106. When control system 204 identifies that mobile device 110 has become available, control system 204 identifies one or more MWI records in storage system 202 that include information on failed delivery attempts to mobile device 110 in step 312. For example, if each MWI record includes a mobile ID, then control system 204 may search storage system 202 for records having the mobile ID of device 110.

For each of the MWI records that are found, control system 204 sends a notification to an external message center based on the routing information in the MWI record in step 314. The notification indicates that mobile device 110 is available, and may also include a message ID for a text message that is being queued. Thus, the notification allows the external message center to retry delivery of the text message. In the example provided above, control system 204 will send a notification to external message center 121 that mobile device 110 is now available. In response to the notification, external message center 121 may retry delivery of the text message to mobile device 110. After the notification is received by the external message center(s) or after the text message is successfully delivered to mobile device 110, control system 204 may delete the MWI records for these text messages in storage system 202 (see step 316) or clear data stored in the MWI records.

There may be instances where an external message center uses a different signaling protocol for text messages than mobile network 100. For example, mobile network 100 may use ANSI protocol while an external message center uses SIP. In order for the notification to be sent to the external message center in the proper protocol, message waiting system 200 is able to identify the signaling protocol used by the external message center and store an indication of the signaling protocol in the MWI record, which is further illustrated in FIG. 4.

Figure 4:
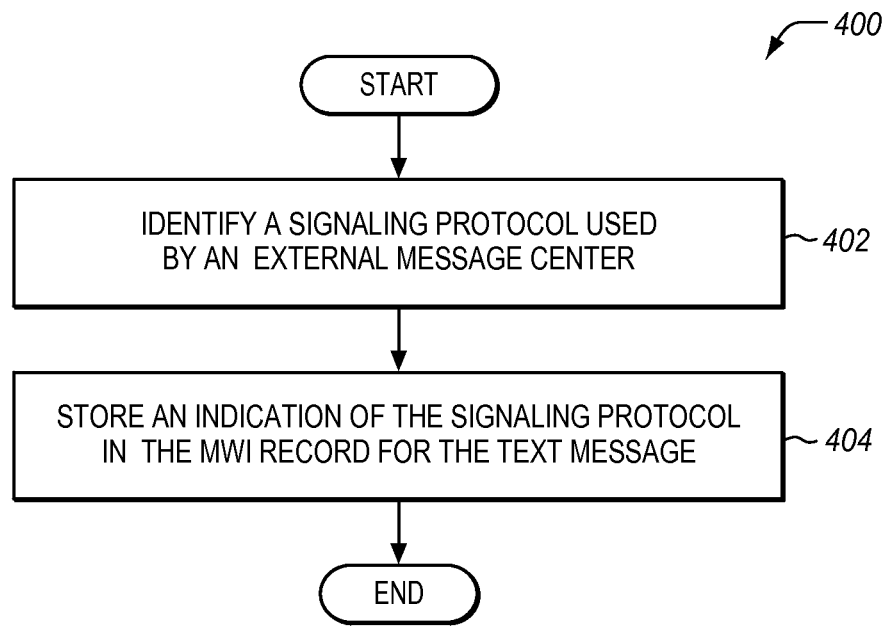
FIG. 4 is a flow chart illustrating a method of identifying a signaling protocol used by external message centers in an exemplary embodiment.

FIG. 4 is a flow chart illustrating a method 400 of identifying a signaling protocol used by external message centers in an exemplary embodiment. The steps of method 400 will be described with reference to mobile network 100 in FIG. 1 and message waiting system 200 in FIG. 2, but those skilled in the art will appreciate that method 400 may be performed in other networks and systems. Steps 402 and 404 may be incorporated into method 300, such as between steps 308 and 310.

In step 402, control system 204 identifies the signaling protocol used by the external message center (e.g., external message center 121) in step 402. Control system 204 may identify the signaling protocol based on the failed delivery attempt. As stated before, the text message sent by external message center 121 is encapsulated in a signaling message. Thus, control system 204 may process the signaling message to identify the signaling protocol used by external message center 121. For example, if the text message is encapsulated in a SIP message, then control system 204 is able to identify that the signaling protocol used by external message center 121 is SIP. Control system 204 may identify the signaling protocol used by external message center 121 in other ways, such as by querying a database, querying external message center 121, etc.

Control system 204 then stores an indication of the signaling protocol in the MWI record for the text message in step 404. Thus, the MWI record for a text message not only includes routing information for external message center 121, but also includes an indication of the signaling protocol used by external message center 121. When control system 204 sends a notification to an external message center based on the routing information in the MWI record (see step 314 in FIG. 3), control system 204 may send the notification to the external message center based on the signaling protocol stored in the MWI record. The external message center may thus receive the notification in the proper protocol.

In the embodiments described above, message waiting system 200 is advantageously able to dynamically store MWI records for external message centers when delivery of a text message fails. The MWI records are stored in addition to the MWI flag that is stored in serving network element 104 (or subscriber database 106) for home message center 108. Based on the MWI records, message waiting system 200 can notify each external message center when mobile device 110 becomes available so that these message centers can attempt delivery again. As a result, not only is home message center 108 notified when mobile device 110 becomes available, but external message centers 121-124 may also be notified.

Figure 5:
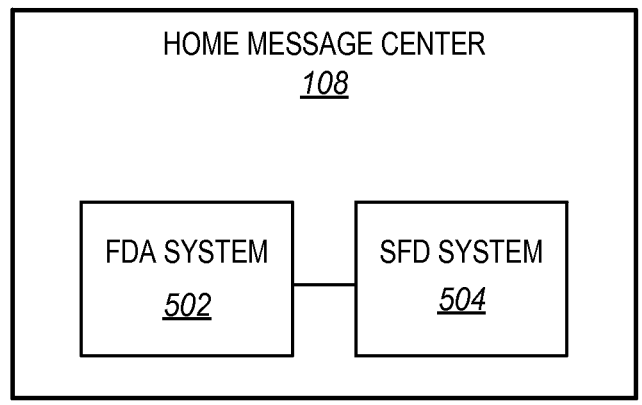
FIG. 5 illustrates a home message center.

There may be instances where message waiting system 200 also notifies systems within home message center 108 when mobile device 110 becomes available. Home message center 108 may include a First Delivery Attempt (FDA) system and a store-and-forward (SFD) system. FIG. 5 illustrates home message center 108 having this structure. FDA system 502 implements FDA processing, which means that when a text message is initially received, delivery of the text message is attempted first before storing the text message. If the first delivery attempt fails, then FDA system 502 may fallback to SFD system 504 to deliver the text message. SFD system 504 implements store-and-forward processing, which means that when the text message is received (such as from FDA system 502), the text message is persistently stored in memory. Delivery of the text message is then attempted to the destination. If the delivery attempt is unsuccessful, then delivery is retried after a time period (e.g., 10 minutes, 30 minutes, etc).

When FDA system 502 is implemented in home message center 108, present standards define that a single MWI flag is stored along with a single static routing address for FDA system 502. For example, serving network element 104 or subscriber database 106 may store the single MWI flag and single static routing address for FDA system 502. If a delivery attempt from FDA system 502 fails, then the MWI flag is set. And if mobile device 110 becomes available, then FDA system 502 is notified based on the MWI flag and the static routing address. However, there is no MWI flag or static routing address stored for SFD system 504, and it is not directly notified when mobile device 110 becomes available. Message delivery system 200 may treat SFD system 504 as an external message center and dynamically store MWI records for text messages originating from SFD system 504.

To notify SFD system 504 when mobile device 110 becomes available, control system 204 identifies a failed delivery attempt of the text message from SFD system 504 to mobile device 110 (see step 302 in FIG. 3), and identifies routing information for SFD system 504 based on the failed delivery attempt (see step 304). Control system 204 then generates a MWI record for the text message that includes the routing information for SFD system 504 (see step 306). Control system 204 may also include a mobile identifier (ID) for mobile device 110 in the MWI record, and a message ID for the text message. Control system 204 then stores the MWI record for the text message in storage system 202 (see step 308).

If control system 204 identifies that mobile device 110 has become available (see step 310), then control system 204 identifies the MWI record in storage system 202 that includes information on the failed delivery attempt by SFD system 504 to mobile device 110 (see step 312). Control system 204 then sends a notification to SFD system 504 based on the routing information in the MWI record (see step 314). Thus, SFD system 504 may be notified when mobile device 110 becomes available in addition to FDA system 502, which improves the performance of home message center 108.

EXAMPLES

Figure 6:
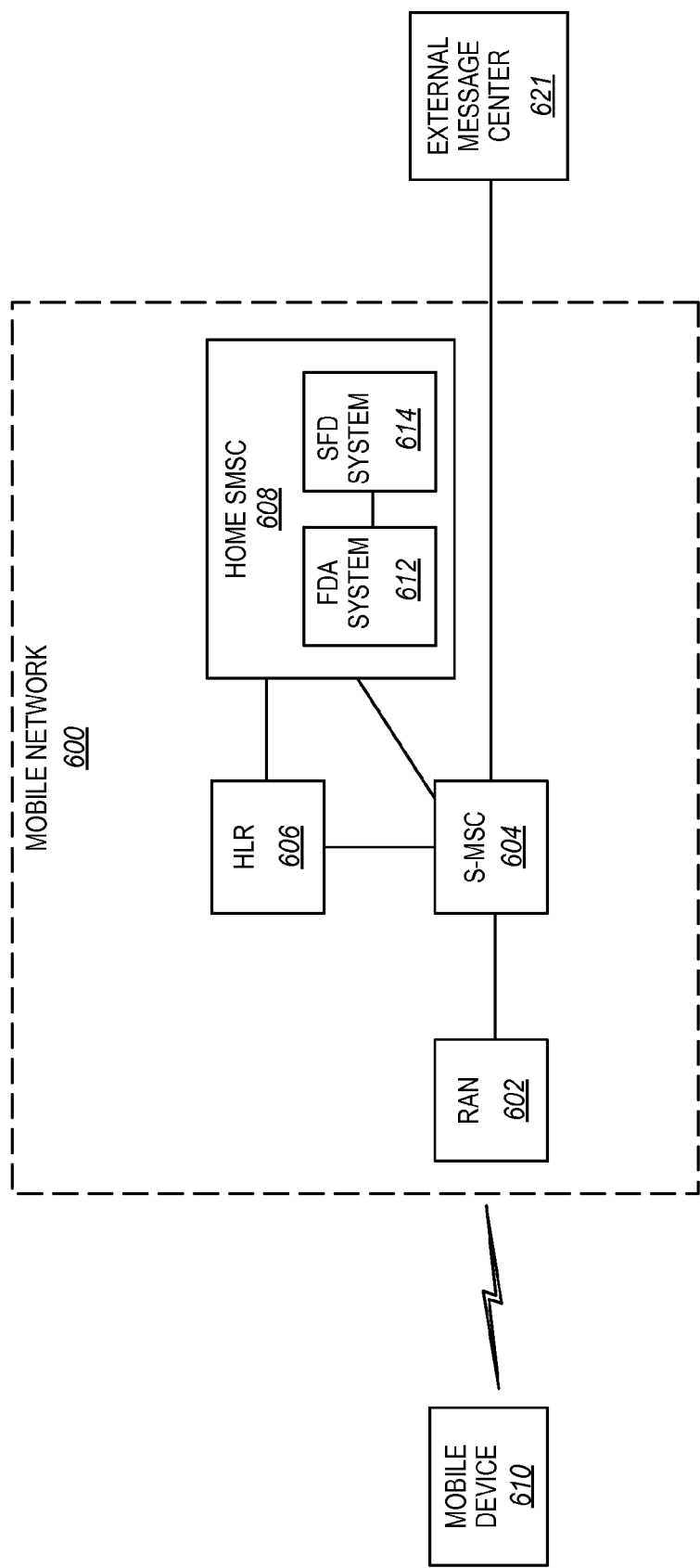
FIG. 6 illustrates a mobile network in an exemplary embodiment.

FIG. 6 illustrates a mobile network 600 in an exemplary embodiment. Mobile network 600 comprises a circuit-based network in this embodiment, such as a CDMA network. Mobile network 600 includes a Radio Access Network (RAN) 602, a serving Mobile Switching Center (S-MSC) 604, a Home Location Register (HLR) 606, and a home SMSC 608. Mobile network 600 is able to provide telecommunication services to a mobile device 610. Mobile network 600 is also connected to an external message center 621 that is able to deliver text messages directly to mobile device 610 without going through home SMSC 608. Although not specifically shown in FIG. 6, assume that S-MSC 604 implements a message waiting system such as described in FIGS. 2-3.

In this architecture, home SMSC 608 includes an FDA system 612 and an SFD system 614. FDA system 612 is able to deliver SMS messages to destinations using FDA processing, which means attempting delivery first before storing the text message. SFD system 614 is able to deliver SMS messages to destinations using store-and-forward processing, which means storing the text message first and then attempting delivery one or more times. FDA system 612 may be implemented in a cluster including multiple FDA nodes but with one SS7 point code or IP address. SFD system 614 may be implemented in multiple nodes for local and geographic redundancy.

Figure 7:
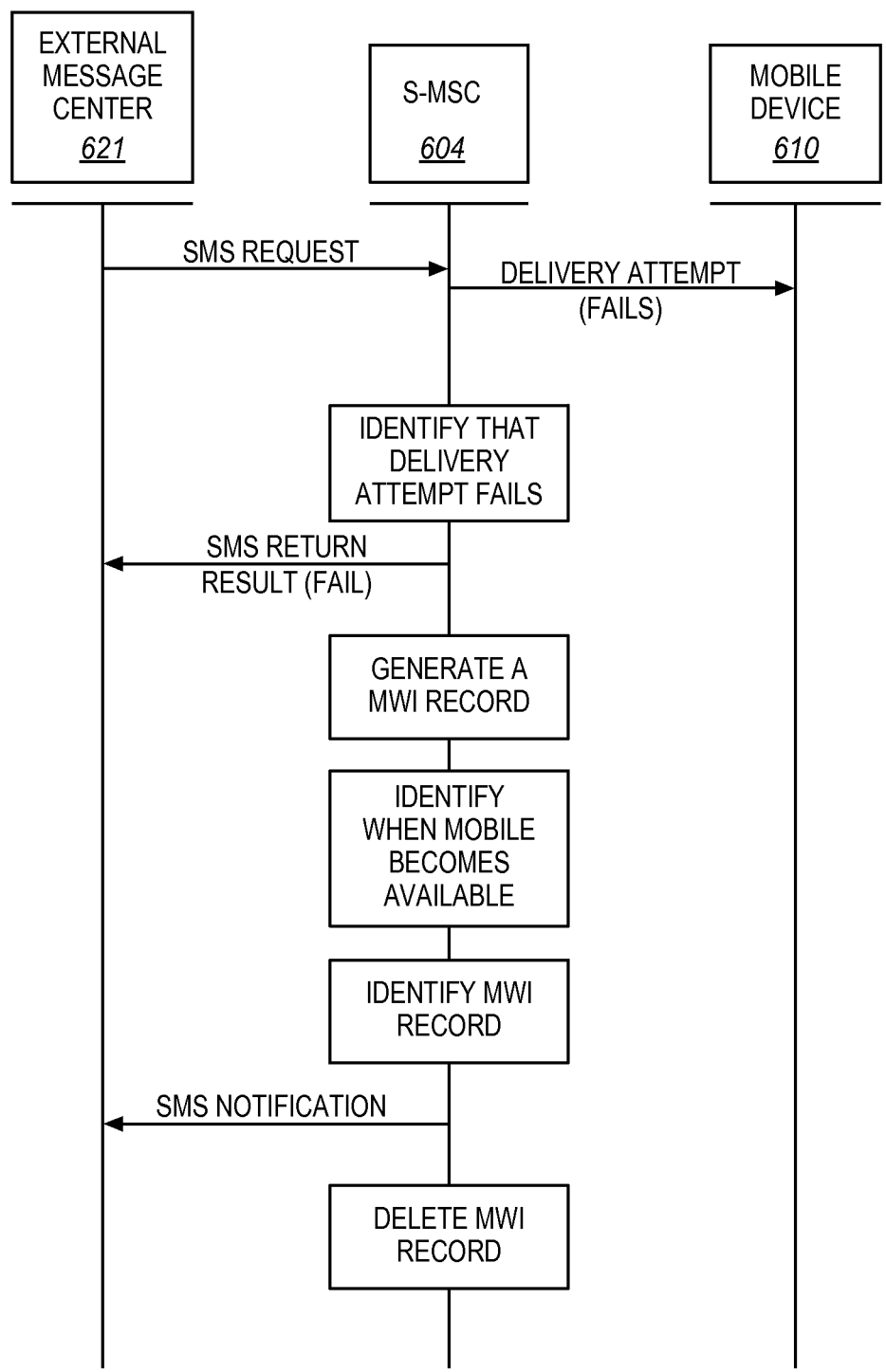
FIG. 7 is a message diagram that illustrates notifying an external message center when a mobile device becomes available in an exemplary embodiment.

Assume for one embodiment that external message center 621 wants to send an SMS message to mobile network 600 that is intended for mobile device 610, but mobile device 610 is temporarily unavailable. FIG. 7 is a message diagram that illustrates notifying external message center 621 when mobile device 610 becomes available in an exemplary embodiment. To send the SMS message, external message center 621 encapsulates the SMS message in an SMS request message, such as a MAP SMS request, an ANSI SMS request, etc. Instead of forwarding the SMS request message to home SMSC 608 for delivery, external message center 621 sends the SMS request message directly to S-MSC 604. In response to the SMS request message, S-MSC 604 attempts to deliver the SMS message to mobile device 610 over RAN 602. Mobile device 610 is temporarily unavailable to receive the SMS message at the time of the delivery attempt, so the delivery attempt fails. Mobile network 600 is advantageously able to notify external message center 621 when mobile device 610 becomes available as described below.

When the delivery attempt fails, S-MSC 604 identifies the failed delivery attempt and sends an SMS return result message to external message center 621. S-MSC 604 then dynamically generates an MWI record for the SMS message, and stores information pertaining to the failed delivery attempt in the MWI record. More specifically, S-MSC 604 identifies routing information for external message center 621 based on the failed delivery attempt, and stores the routing information in the MWI record. In this example, external message center 621 sent the SMS message to S-MSC 604 in an SMS request message that included a point code for external message center 621. Thus, S-MSC 604 is able to process the SMS request message to identify the routing information for external message center 621, which is its point code. S-MSC 604 stores the point code for external message center 621 in the MWI record along with a mobile ID for mobile device 610, a message ID for the SMS message, and a protocol used by external message center 621.

At some point, mobile device 610 may become available which is detected or identified by S-MSC 604. When S-MSC 604 identifies that mobile device 610 has become available, S-MSC 604 identifies the MWI record that is stored for a failed delivery attempt from external message center 621 to mobile device 610. S-MSC 604 then sends an SMS notification to external message center 621 based on the point code stored in the MWI record. The SMS notification indicates that mobile device 610 is available, and may also include a message ID for an SMS message that is being queued. Thus, the SMS notification allows external message center 621 to retry delivery of the SMS message to mobile device 610. After the SMS notification is received by external message center 621, S-MSC 604 may delete the MWI record.

Figure 8:
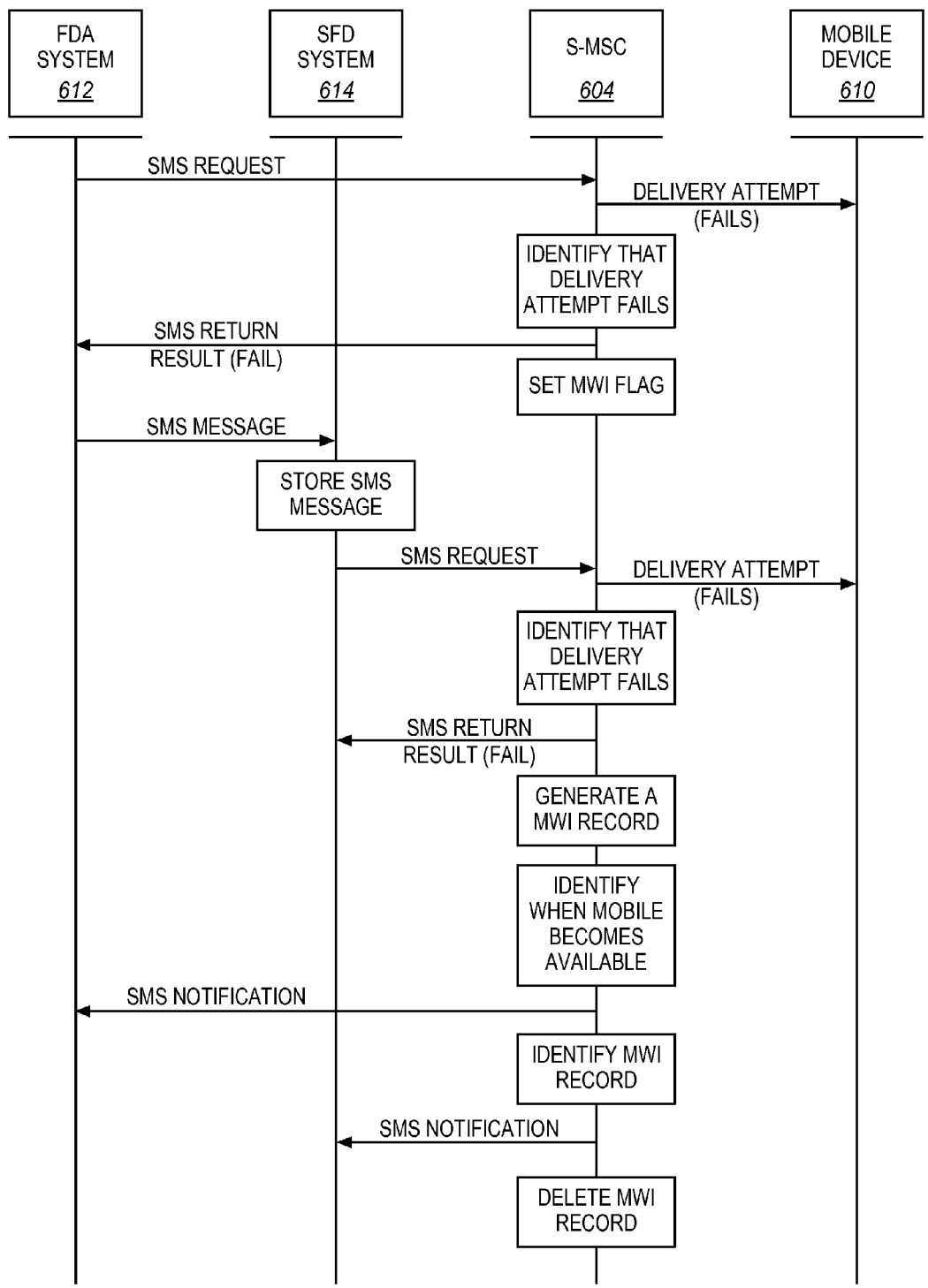
FIG. 8 is a message diagram that illustrates notifying a home SMSC when a mobile device becomes available in an exemplary embodiment.

Assume for another embodiment that home message center 608 wants to send an SMS message to mobile device 610, but mobile device 610 is temporarily unavailable. FIG. 8 is a message diagram that illustrates notifying home SMSC 608 when mobile device 610 becomes available in an exemplary embodiment. When home SMSC 608 receives an MT SMS message destined for mobile device 610 (see FIG. 6), FDA system 612 implements FDA processing to attempt delivery first. To do so, FDA system 612 sends an SMS request message to S-MSC 604 before storing the SMS message. S-MSC 604 attempts to deliver the SMS message to mobile device 610 over RAN 602. Mobile device 610 is temporarily unavailable to receive the SMS message at the time of the delivery attempt, so the delivery attempt fails. Thus, S-MSC 604 sets a message waiting indicator flag (one example of which is defined in the ANSI protocol). S-MSC 604 sends an SMS return result message to FDA system 612 indicating that the delivery attempt failed.

In response to the return result message, FDA system 612 forwards the SMS message to SFD system 614. SFD system 614 then stores the SMS message for delivery. Next, SFD system 614 sends an SMS request message to S-MSC 604, and S-MSC 604 attempts to deliver the SMS message to mobile device 610 over RAN 602. Further assume that mobile device 610 is still unavailable to receive the SMS message at the time of the delivery attempt. Because mobile device 610 is not available, the delivery attempt of the SMS message fails which is identified by S-MSC 604. Thus, S-MSC 604 sends an SMS return result message to SFD system 614. S-MSC 604 then dynamically generates an MWI record for the SMS message, and stores information pertaining to the failed delivery attempt in the MWI record. More specifically, S-MSC 604 identifies routing information for SFD system 614 based on the failed delivery attempt, and stores the routing information in the MWI record. In this example, SFD system 614 sent the SMS message to S-MSC 604 in an SMS request message that includes the point code for SFD system 614. Thus, S-MSC 604 is able to process the SMS request message to identify the routing information for SFD system 614, which is its point code. S-MSC 604 stores the point code for SFD system 614 in the MWI record along with a mobile ID for mobile device 610 and a message ID for the SMS message.

At some point, mobile device 610 may become available which is detected or identified by S-MSC 604. Based on internal logic traditionally implemented within S-MSC 604, the S-MSC 604 processes the MWI flag to see if it is set (which it is in this example). When the MWI flag is set, S-MSC 604 sends an SMS notification to FDA system 612 that mobile device 610 is available. This SMS notification is sent based on a routing address for FDA system 612 that is pre-provisioned (i.e., statically defined) within S-MSC 604. When FDA system 612 receives the SMS notification, the FDA system 612 is not able to retry delivery of the SMS message because it does not have an SMS message queued for re-delivery. Thus, FDA system 612 may not perform any action in response to the SMS notification. Alternatively, FDA system 612 may be programmed to forward the SMS notification to the SFD system 614 for retry. However, there may be multiple SFD systems 614 within home message center 608, and FDA system 612 may not know which SFD system 614 to forward the SMS notification to. In addition, forwarding the SMS notification to a SFD system may not be an effective solution in the network.

Additionally in accordance with the embodiments described herein, when S-MSC 604 identifies that mobile device 610 has become available, S-MSC 604 identifies the MWI record that is stored for a failed delivery attempt from SFD system 614 to mobile device 610. S-MSC 604 then sends an SMS notification to SFD system 614 based on the point code stored in the MWI record. The SMS notification indicates that mobile device 610 is available, and may also include a message ID for an SMS message that is being queued. Thus, the SMS notification allows SFD system 614 to retry delivery of the SMS message to mobile device 610. After the SMS notification is received by SFD system 614 or after the SMS message is successfully delivered, S-MSC 604 may delete the MWI record or clear data stored in the MWI record.

This example shows that when a message waiting system (e.g., message waiting system 200) is implemented in S-MSC 604, S-MSC 604 is able to directly notify SFD system 614 when mobile device 610 becomes available in addition to notifying FDA system 612. This is an advantage over prior mobile networks that only allow direct notification of an FDA system which may not be able to forward the notification to a given SFD system. The notification to SFD system 614 allows home SMSC 608 to operate more effectively.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. A message waiting system comprising:
a control system operable to identify a failed delivery attempt of a text message to a mobile device that is unavailable, where the text message originated from an external message center that sent the text message directly to the mobile device without going through a home message center of the mobile device;
wherein the control system is further operable to identify routing information for the external message center based on the failed delivery attempt, to identify when the mobile device becomes available, and to send a notification indicating that the mobile device is available to the external message center based on the routing information to allow the external message center to retry delivery of the text message to the mobile device.

2. The message waiting system of claim 1 wherein:
the control system is further operable to identify a signaling protocol used by the external message center, to store an indication of the signaling protocol, and to send the notification to the external message center based on the signaling protocol.

3. The message waiting system of claim 2 wherein:
the control system is further operable to identify the signaling protocol used by the external message center based on the failed delivery attempt.

4. The message waiting system of claim 1 wherein:
the control system is further operable to store a mobile identifier for the mobile device.

5. The message waiting system of claim 1 wherein:
the control system is further operable to delete the routing information for the external message center after the notification is received by the external message center.

6. The message waiting system of claim 1 wherein the routing information for the external message center comprises a point code.

7. The message waiting system of claim 1 wherein the routing information for the external message center comprises an Internet Protocol (IP) address.

8. A method comprising:
identifying a failed delivery attempt of a text message to a mobile device that is unavailable, where the text message originated from an external message center that sent the text message directly to the mobile device without going through a home message center of the mobile device;
identifying routing information for the external message center based on the failed delivery attempt;
identifying when the mobile device becomes available; and
sending a notification indicating that the mobile device is available to the external message center based on the routing information to allow the external message center to retry delivery of the text message to the mobile device.

9. The method of claim 8 further comprising:
identifying a signaling protocol used by the external message center;
storing an indication of the signaling protocol; and
sending the notification to the external message center based on the signaling protocol.

10. The method of claim 9 wherein identifying a signaling protocol used by the external message center comprises:
identifying the signaling protocol used by the external message center based on the failed delivery attempt.

11. The method of claim 8 further comprising:
storing a mobile identifier for the mobile device.

12. The method of claim 8 further comprising:
deleting the routing information for the external message center after the notification is received by the external message center.

13. The method of claim 8 wherein the routing information for the external message center comprises a point code.

14. The method of claim 8 wherein the routing information for the external message center comprises an Internet Protocol (IP) address.

15. An apparatus comprising:
a network element operable to serve a mobile device, wherein the network element includes a control system operable to identify a failed delivery attempt of a text message to the mobile device that is unavailable, wherein the text message originated from an external message center that sent the text message directly to the mobile device without going through a home message center of the mobile device;
wherein the control system is further operable to identify when the mobile device becomes available, and to send a notification indicating that the mobile device is available to the external message center to allow the external message center to retry delivery of the text message to the mobile device.

16. The apparatus of claim 15 wherein:
the control system is further operable to identify routing information for the external message center based on the failed delivery attempt, to generate a message waiting indicator (MWI) record for the text message that includes the routing information for the external message center, and to store the MWI record in a storage system;
the control system is further operable to identify when the mobile device becomes available, to identify the MWI record in the storage system that includes information on the failed delivery attempt by the external message center, and to send the notification indicating that the mobile device is available to the external message center based on the routing information in the MWI record.

17. The apparatus of claim 16 wherein:
the control system is further operable to identify a signaling protocol used by the external message center, to store an indication of the signaling protocol in the MWI record, and to send the notification to the external message center based on the signaling protocol indicated in the MWI record.

18. The apparatus of claim 16 wherein:
the control system is further operable to delete the MWI record after the notification is received by the external message center.

19. The apparatus of claim 16 wherein the routing information for the external message center comprises a point code.

20. The apparatus of claim 15 wherein:

the control system is further operable to identify a failed delivery attempt of a text message to the mobile device from a store-and-forward (SFD) system within the home message center, wherein the home message center further includes a First Delivery Attempt (FDA) system;

the control system is further operable to identify routing information for the SFD system based on the failed delivery attempt, to generate a message waiting indicator (MWI) record that includes the routing information for the SFD system, and to store the MWI record in a storage system;

the control system is further operable to identify when the mobile device becomes available, to identify the MWI record in the storage system that includes information on the failed delivery attempt by the SFD system, and to send another notification indicating that the mobile device is available to the SFD system based on the routing information in the MWI record.

\* \* \* \* \*